Figure 1:
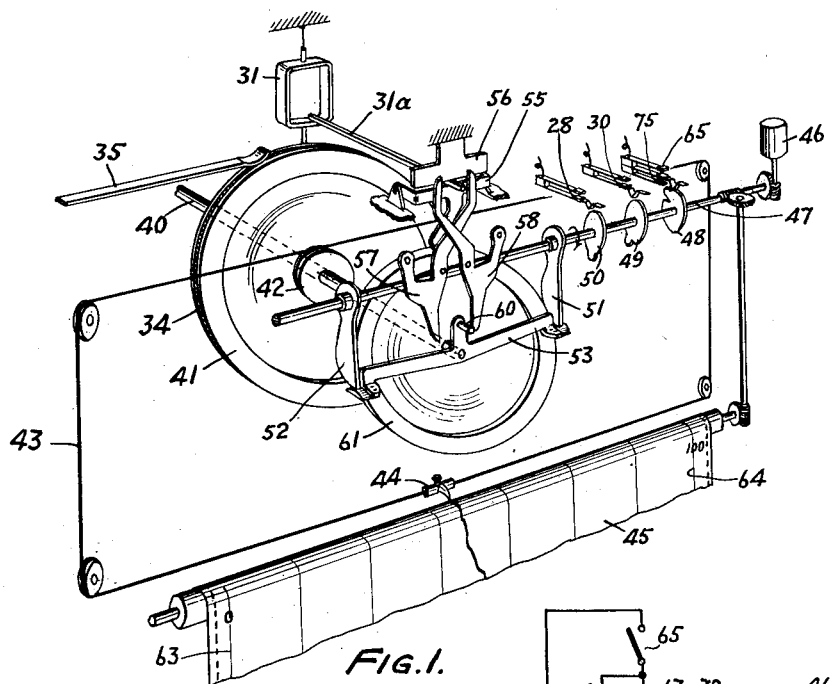

May 11, 1948.   W. E. PHILLIPS ET AL   2,441,226
MEASUREMENT OF TELEMETRIC SIGNALS DURING TIME-SPACES THEREBETWEEN
Filed March 23, 1944   2 Sheets-Sheet 1

INVENTORS
William E. Phillips &
Felix Wunsch
BY
Virgil E. Woodcock
ATTORNEY.

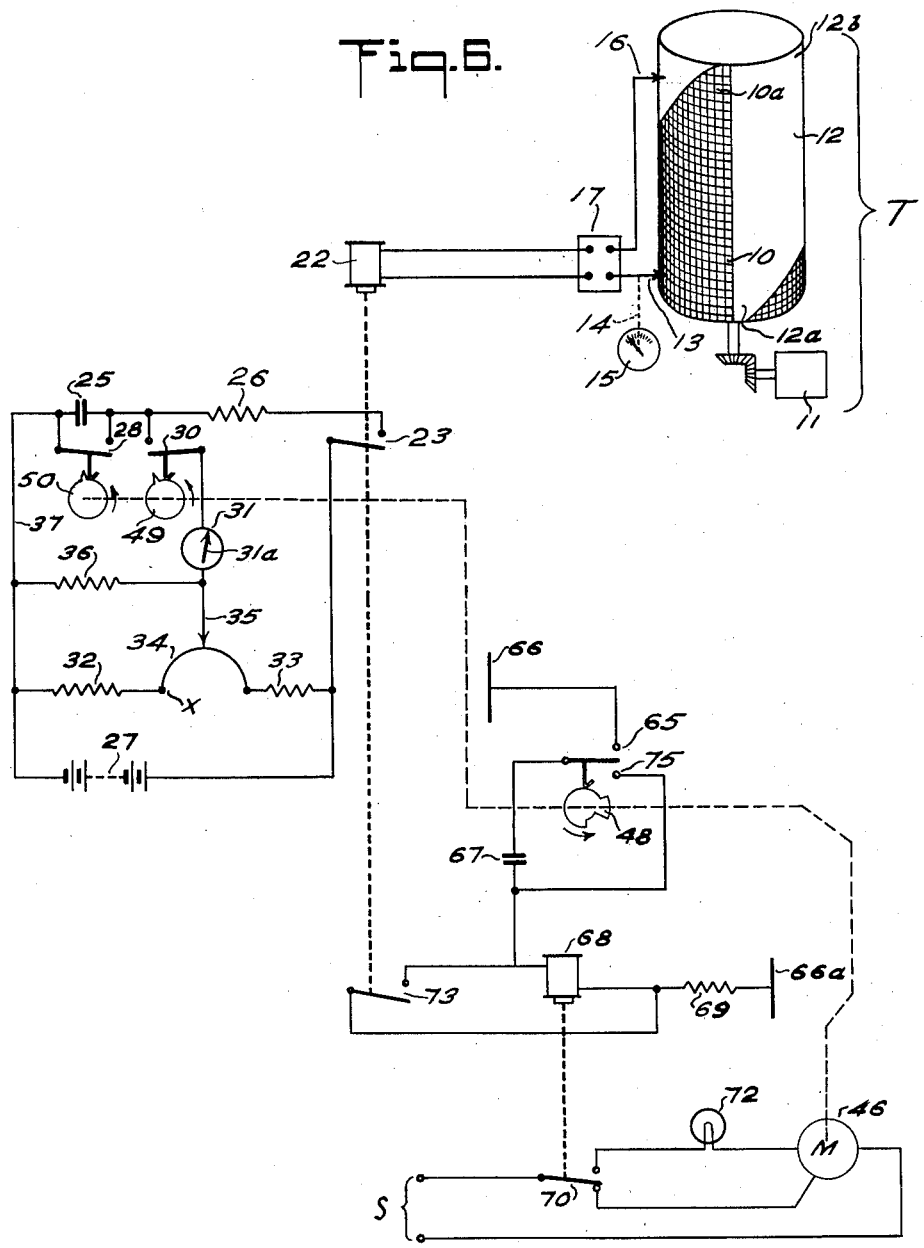

Patented May 11, 1948

2,441,226

UNITED STATES PATENT OFFICE 2,441,226

MEASUREMENT OF TELEMETRIC SIGNALS DURING TIME SPACES THEREBETWEEN

William E. Phillips, Drexel Hill, and Felix Wunsch, Philadelphia, Pa., assignors to Leeds and Northrup Company, Philadelphia, Pa., a corporation of Pennsylvania Application March 23, 1944, Serial No. 527,734

9 Claims. (Cl. 177—351)

This invention relates to systems for electrically indicating, recording or reproducing physical, electrical or mechanical magnitudes or conditions, or other magnitudes or conditions including departures or displacements of devices in general, and relates more particularly to telemetric systems of the type in which electrical impulses are produced, whose durations are related to the aforesaid conditions or magnitudes, and which may be transmitted to receiving stations.

More particularly, this invention relates to telemetric systems of the type disclosed in the Doyle Patent No. 2,336,929. Telemetric systems as described in said Doyle patent have been found satisfactory, but leave something to be desired in the way of greater simplicity and the elimination of lag in the indication of the magnitude of the condition under measurement.

When the transmitter and receiver of a telemetering system may be operated from the same source of alternating current supply, it is relatively easy to produce timed operation as between the transmitter and receiver. There are many cases, however, where different alternating current sources supply the transmitter and receiver. In consequence, the system frequency at the transmitter is not likely to be in phase, nor to stay in phase, with the frequency of the source of supply for the receiver. The differences in frequency prevent accurate phasing of the cycles of operation at the transmitter and receiver. As soon as the transmitter and receiver get out of step, or lose their desired dependent timed operation, accurate reproduction of the transmitted signals is prevented.

It is an object of the present invention to provide automatic phasing of the receiving mechanism with respect to the sending mechanism, regardless of differing system frequencies at the transmitter and receiver.

It is a further object of the invention to provide an indication at the receiver both of abnormal operation of the transmitter and of the character of such abnormality.

A further object of the invention is to provide a measuring circuit with means for compensating for the non-linearity of a voltage which is measured.

In carrying out the present invention in one form thereof, a transmitter produces time-spaced signals of variable lengths. Each signal has a length which is representative of the then existing magnitude of a condition. These signals of variable length are spaced from each other, and hence may be referred to as time-spaced signals.

At the receiving location the time-spaced signals produce potential differences whose magnitudes vary with the lengths of said signals. By measuring the potential differences an indication may be had of the magnitude of said condition at the time of production of the signals.

The receiver itself operates through a cycle of operations. A capacitor is charged a length of time corresponding with one or more of the transmitter signals. The voltage or charge on the capacitor is then measured, and the capacitor discharged preparatory to the reception of additional signals from the transmitter. Near the end of each cycle of operations the receiver mechanism is decelerated. In response to a transmitter signal the next cycle of operations is initiated. In this manner the receiver operates in timed or phased relation with respect to the transmitter.

If the transmitter fails to send a signal, the receiver continues operation. In response to an abnormal condition, an indication is produced indicating not only its existence but the character of the abnormality. The indicator at the receiver is moved beyond one of its normal limits for one abnormal condition, and beyond the other normal limit of operation for the other abnormal condition.

Because of the non-linear voltage variation of the capacitor, which is charged through a series resistance, in accordance with the aforesaid impulses, the indicator, or recorder scale, would not be linear. However, by providing a resistance network for the production of a balancing voltage which automatically compensates for the non-linear voltage variation of the capacitor, the scale can be made linear.

Figure 2:
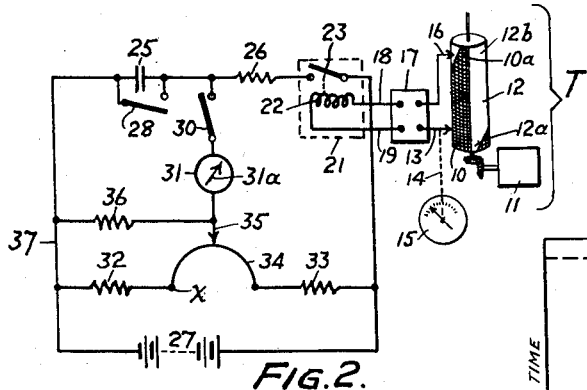
Figure 3:
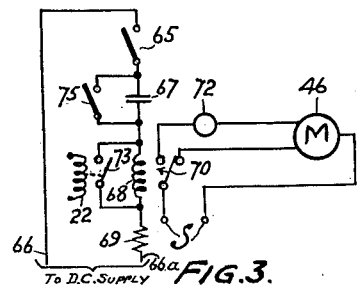
Figure 4:
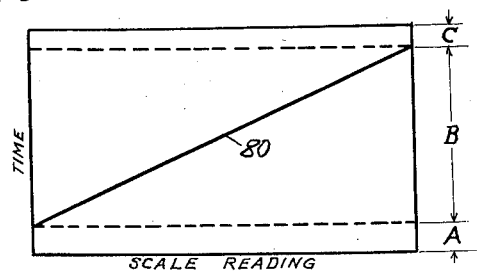
Figure 5:
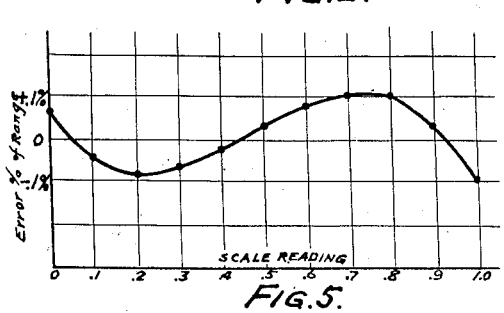

For a more detailed explanation of the invention, and for further objects and advantages thereof, reference is to be had to the following detailed description, taken in conjunction with the accompanying drawings, in which:

Fig. 1, in perspective, illustrates significant elements of a telemetric receiver;

Fig. 2 diagrammatically illustrates a part of the telemetric transmitting and receiving system;

Fig. 3 diagramamtically illustrates an additional part of the telemetric receiving system;

Figs. 4 and 5 are graphs explanatory of the operation of the invention; and

Fig. 6 diagrammatically illustrates in a single system the component parts of Figs. 2 and 3.

Referring to Fig. 2, the transmitter T includes a circuit-interrupting, or modulating, device of any type suited to produce a series of signals whose lengths are determined by, or which vary with a function of, the magnitude of a condition, for example, pressure, rate of flow, voltage, current and watts. Preferably, this circuit-interrupting device is of the general form shown in Fig. 5 of said Doyle patent and fully described therein. For simplicity, this device has been diagrammatically illustrated in Fig. 2 hereof as comprising a cylinder 10 of insulating material which is rotated at constant speed, as by a motor 11. The cylinder 10 is provided with a conducting surface or contact 12, so shaped that the fraction of a revolution, during which it engages the cooperating contact 13, depends upon the position of the latter, axially of the cylinder 10.

The contact 13 is suitably coupled, for example, mechanically as indicated by the broken line 14 to an instrument 15, responsive to the condition, the magnitude of which is to be transmitted to a receiving system. Preferably, the instrument 15 is of the type disclosed in the Squibb Patent No. 1,935,732.

With the movable contact 13 in its lowermost position it will be observed the circuit between the contact 16 and the contact 13 will be completed during a relatively short time interval and while the contact 13 engages the relatively short portion 12a of the conducting surface 12. Due to the shape of the surface or conducting segment 12, illustrated as a spiral, as the contact 13 moves upwardly it remains in contact with the segment 12 during progressively longer intervals. In its uppermost position, as indicated at 12b, the contact remains in engagement with the segment 12, except for the relatively short space 10a occupied by the insulating material.

The additional circuit elements at the transmitter are conventional and are generically indicated by the box 17. As shown in said Doyle patent, No. 2,336,929, these circuit elements include a source of supply for producing impulses, or signals, which correspond in length with the time that the contact 13 remains in engagement with the segment 12. As long as the contact 13 occupies its uppermost position, signals of maximum length will be produced. Nevertheless, these signals will be time-spaced from each other, which time-space will correspond with the traverse time of the contact 13 with respect to the insulating portion 10a. Obviously, the entire time space between signals will be complementary to the duration of each signal; that is, the longer are the signals the shorter will be the time spaces between them. These signals are transmitted in any suitable manner to a receiving location. For example, they may be transmitted over conductors 18 and 19 to a relay 21. This relay may be operated directly or through a suitable amplifying mechanism so that its operating coil 22 closes the contacts 23 for time intervals corresponding with the transmitted signals.

For many applications, the transmitter signals are transmitted over power lines by carrier current systems. For example, in a typical power distribution network many sources of power serve to supply the system load. It is important to measure and rapidly to transmit to the load dispatcher's offices the magnitudes of the tie line loads. The speed with which these load readings are received is important because the major tie lines of a network are under automatic control. The load dispatcher needs to know as soon as possible the system requirements in order properly to control the loads of the several tie lines.

The present system is well adapted to meet the foregoing needs. As already indicated, the principal requirement is a communication channel, wire, carrier current, or radio, by means of which the transmitter signals may be received at the recording and indicating location.

Continuing with the description of the operation of the system, when the relay contacts 23 close, a charging circuit is completed for a capacitor 25, which circuit includes a series resistor 26 and a suitable source of direct current supply, such as indicated by the battery 27. As well understood in the art, the charge acquired by a capacitor in series with a resistor rises exponentially with time. For most applications the capacitor 25 may be of the order of two microfarads. It is preferably a capacitor of high quality, low power factor, and negligible leakage, such as is characteristic of well constructed capacitors using mica as the dielectric. It will be observed the capacitor 25 is discharged upon closure of the contacts 28.

After the capacitor 25 has been charged during a time interval corresponding with the length of one of the signals from the transmitter T, the relay contacts 23 open and the contacts 30 are closed to connect the capacitor 25 across a measuring circuit, which includes a ballistic galvanometer 31. The measuring circuit is of the potentiometer type and includes resistors 32 and 33 in series with a slidewire resistor 34. A contact 35 is positioned relative to the slidewire 34 by a suitable mechanism, or relay system, of the type generally shown in the aforesaid Patent No. 1,935,-732. The potentiometer system also includes a resistor 36 connected in multiple, or parallel relation, with the resistor 32, and with that portion of the slidewire 34 which extends from the point X to the contact 35.

The slidewire 34 is of conventional form. As far as the electrical circuit is concerned, the resistors 32 and 33 may be considered as integral with or extensions of the slidewire. They are supplied and illustrated as separate resistors in order to produce the desired circuit constants with a conventional slidewire having less resistance than is needed to meet the requirements of the present invention.

At the instant of closure of the contacts 30 the coil of the ballistic galvanometer 31 responds to the difference in the voltage or potential difference across the capacitor 25, and that which exists between the conductor 37 and the contact 35.

A ballistic galvanometer has the characteristic of deflecting to its final position within the same time interval, regardless of the extent of movement required thereof. In other words, if a small potential difference is applied to the galvanometer 31, the pointer 31a is deflected a small amount. If a relatively large potential difference is applied, it deflects a correspondingly greater amount. With the larger potential difference the speed of movement is correspondingly increased so that the overall time remains approximately the same, regardless of the distance through which the pointer 31a must be moved. Advantage is taken of this characteristic in the timing of the cycle of operations at the receiver.

Before describing the cycle of operations as a whole, reference will now be had to Fig. 1 where a fractional part of a suitable relay mechanism has been illustrated. As shown in the aforesaid Patent No. 1,935,732, as well as in Fig. 1, the relay mechanism is provided with a shaft 40 which carries a disc 41 on which the slidewire 34 is mounted. The shaft also carries a driving pulley 42 for a violin string 43 which serves to drive a recording pen 44 across a strip chart 45. Though not illustrated herein, a pointer is generally attached to the pen 44 or to the violin string 43 and is driven across a suitable indicating scale. The position of the pen 44 with respect to the calibrated chart 45 serves both as a recording and as an indicating means.

The recorder chart 45 is normally driven at substantially constant speed by any suitable source. As shown, it is driven by a motor 46 whose principal function is to operate the recorder mechanism. This motor 46 drives through the associated gearing a shaft 47 on which are mounted switch operating cams 48, 49 and 50. The shaft 47 also drives a pair of cams 51 and 52, which cooperate with a pivoted clutch member 53. The clutch member 53 is angularly positioned in one direction or the other by means of the galvanometer pointer 31a and a feeler and clamping mechanism. For example, when an unbalance exists in the measuring circuit of Fig. 2, the galvanometer 31 deflects from the neutral position to the right or to the left, depending upon the direction of the unbalance; that is, whether the potential difference across the capacitor 25 is greater or less than the potential difference across the measuring circuit. Upon deflection of the pointer 31a a clamping bar 55 is moved upwardly by means of a cam to press and to clamp the pointer 31a against a cooperating stop of clamping member 56. While the pointer is so held, a pair of feelers 57 and 58 are released by a cam, not shown, rotating with the shaft 47 for movement toward one another by a biasing spring, not shown. The upper end of one or the other of the feelers is stopped by engagement with the end of the pointer 31a. The other feeler continues its movement, and the lower end thereof engages a pin 60, extending from the clutch arm 53 thereby to rotate the arm 53 an amount depending upon the extent of the deflection of the pointer 31a. Subsequently, in the cycle of the mechanism the clutch member 53 is moved inwardly against a clutch disc 61. While the clutch members are so engaged, one or the other of the cams 51 and 52 engages the driving clutch member 53 and restores it to its original neutral position, and in doing so rotates the disc 61 and the shaft 40. This, of course, produces rotation of the slidewire 34 and the driving pulley 42. The movement of the slidewire 34 restores balance to the measuring network, and the movement of the driving pulley 42 drives the pen 44 to a new position indicative of the extent of change in the unbalance in the measuring network. The pointer 31a is then unclamped.

For purposes of the present invention, the instant of operation of the clamping bar 55 is important. The pointer 31a is clamped as it arrives at the maximum deflection produced by the potential difference between the capacitor 25 and the measuring circuit Since the time interval for deflection of the ballistic galvanometer is substantially constant regardless of the extent of its deflection, the clamping of the galvanometer occurs in a predetermined time after closure of the contacts 30. While the galvanometer pointer 31a is clamped, the contacts 30 are opened and the contacts 28 are closed and opened. The interruption of the galvanometer circuit does not result in movement of the pointer 31a since it is then held or clamped in a fixed position.

In accordance with the present invention, the phasing of the receiver is under the control of the transmitter. It is phased in manner such that contacts 23 are always open during the fairly rapid closure and opening of contacts 30 and 28.

It will be recalled that when the instrument 15 of the transmitter indicates a minimum or zero reading, impulses of predetermined lengths are transmitted to the receiver relay 21. When signals of this minimum length are being transmitted, the measuring network has circuit constants so selected that the relative movement, between the contact 35 and the slidewire 34 in producing a balance, adjusts the recording and indicating pen 44 to the minimum or zero position on the recorder chart, as indicated at 63. When signals of maximum lengths are produced by the transmitter the indicator-recorder pen 44 is then moved to the maximum position of the chart, as indicated at 64. Though these maximum and minimum positions are adjacent the respective edges of the chart, provision is made for additional movement of the indicator pen beyond such positions.

The foregoing cycle of operations at the receiver may be completed in a relatively short time. In one embodiment of the invention the aforesaid cycle was completed in 2.4 seconds. In the same embodiment of the invention the transmitter completed its cycle of operations in 2.5 seconds. The difference of a tenth of a second is utilized for the phasing of the receiver with respect to the transmitter. This is accomplished in the following manner. As the cycle of receiver-operations is completed, the switch-operating cam 48 operates to close contacts 65, Figs. 1 and 3, to complete a circuit which may be traced from one side 66 of a suitable direct current source of supply through the contacts 65, a capacitor 67, a relay coil 68 and through a resistor 69 to the other side 66a of the direct current source of supply. The relay 68 immediately operates a motor switch 70 to change the motor connections from "forward" to "reverse." As shown in Fig. 3 the motor 46 is energized from a suitable source of supply S for operation of the motor at normal speed, and in the correct direction to advance the chart 45 and to drive the shaft 47. Since the chart is driven by motor 46 it is synchronized with the operation of the transmitter.

Upon operation of the switch 70 a reverse winding (not shown) of the motor 45 is energized through a circuit which includes a current-limiting device, which may be a lamp 72 of proper size. In the aforesaid embodiment of the invention a 6-watt lamp was satisfactory and adequate for deceleration of the motor 46 to stand still without actual reversal thereof. When the filament of the lamp is cool, more current flows. The braking action is therefore greater. When the filament is hot, the motor current is reduced to such a low value that actual reversal is prevented.

Normally, within a tenth of a second, a further impulse is received from the transmitter. The relay coil 22 is energized and it will be observed it not only closes the contacts 23, Fig. 2, but it also closes a contact 73 to short-circuit the coil 68. This causes the motor switch 70 to return to its original position for normal energization of the motor 46 for operation in the forward direction. In this manner, every cycle of the receiver is initiated by the reception of a transmitter signal. This dependent operation keeps the transmitter and receiver in timed relation, one with the other. If the transmitter changes its cycle of operation and sends signals at a slower or faster rate, the receiver does not get out of step. Each cycle thereof is initiated by the incoming signal. This constant phasing of the receiver is adequate to take care of relatively large variations in speeds of operation as between the transmitter and the receiver, and is adequate to take care of variations in speed which arise due to changes in system frequencies, particularly in those cases where the transmitter and receiver are supplied from independent sources.

The foregoing initiation of each cycle of operations of the receiver is due to a transmitter signal. This signal closes contacts 23 with the receiver in a predetermined position, that is, a position corresponding with the beginning of a cycle. Consequently, there is no possibility of closure and opening of contacts 28 and 30 during the time the contacts 23 are closed. While the motor 46 advances the switch operating cams 48—50, the contacts 23 may be closed, depending upon the length of the transmitter signals. Even with signals of maximum normal length, the contacts 23 open prior to the closure of contacts 30.

This always occurs due to dependent timing and because of the foregoing phasing. As soon as contacts 30 and 28 have been closed and opened, the magnitude of the charge or voltage which existed across capacitor 25 has produced deflection of the galvanometer pointer 31a and it is clamped in its deflected position. After it is clamped another transmitter signal may be received by the relay 21 with consequent charging of capacitor 25 during the time the mechanical relay is completing its operation. As it completes its cycle, contacts 65 close thereby to place the relay 68 under the control of phasing contacts 73 of relay 21.

Though the transmitter and receiver may be operating at approximately the same speed, it is to be understood the transmitter cycle may be any multiple (of from one upward) of the receiver cycle. For example, if the transmitter completes two cycles for one of the receiver, the capacitor 25 would integrate the two signals received from the transmitter. Nevertheless, at the completion of a receiver cycle the beginning of a new cycle would be initiated by operation of relay 21 in response to a transmitter signal. Phasing as between transmitter and receiver would be insured at all times.

Even though the transmitter and receiver may be connected to the same generating system, the present invention may be used to advantage. In telemetering systems it is important to know of the existence of abnormal conditions of operation. These may arise due to an open circuit in the transmission line, or due to a short circuit. The difficulty may reside in the transmission channel itself. There may be a failure, or open circuit, of the transmitting means which produces the impulses or signals. Again, instead of time-spaced signals a short circuit, or other defect, may result in the production of a continuous signal.

In the event an abnormality occurs which results in the absence of impulses or signals at the relay 21, the following operations take place. As the receiver cycle nears completion, the contacts 65 are closed. The charging current for the capacitor 67 causes the relay 68 to operate the motor switch 70 to brake the motor to standstill. As the capacitor 67 becomes fully charged, the current flowing through the coil 68 decreases below a value which will retain the switch 70 in the braking position. It, therefore, returns to the normal running position to initiate a further cycle of operations. The contacts 65 thereupon open, and due to a recess in the cam 48 the contacts 75 are closed to remove the charge from the capacitor 67 and to condition it for the next cycle of operations. The crest of cam 49 thereupon closes the contacts 30 to connect the measuring circuit across the capacitor 25. Since there are no signals, there will be no potential on the capacitor 25. Consequently, the galvanometer 31 will deflect in a direction to produce movement of the slidewire 34 to its minimum position. Immediately after the closing of the contacts 30, pointer 31a is clamped and thereafter contacts 30 open and the crest of the cam 50 operates to close and open the contacts 28. Ordinarily the closure of these contacts remove the charge from the capacitor 25 to prepare it for the next signal to be received from the transmitter. In this case there is no charge on the capacitor 25. The relay mechanism then operates to move the indicator pen 44 not only to the zero position at 63, but slightly beyond it. In this manner there is indicated not only the existence of the abnormal condition, but also the character thereof, the absence of signals.

If the abnormal condition be of opposite character and a continuous signal is applied to the relay 21, the contacts 23 and 73 will remain closed. Because the contact 73 remains closed, the motor 46 is not decelerated, but immediately initiates the operation of a further receiver cycle. As before, the contacts 30 close. In this instance the galvanometer 31 deflects to produce operation of the slidewire 34 beyond its maximum position. The result is that the indicator pen 44 is moved slightly beyond its maximum position, as indicated at 64. In this manner the existence and character of this abnormal condition of operation is obtained.

In brief summary, the operations are further illustrated by the graph of Fig. 4, plotted with scale reading as abscissae and time as ordinates. The time A corresponds with normal signals of minimum length, such, for example, as occur when the contact 13 traverses the narrow conducting portion 12a of the segment 12. Signals of this length produce movement of the indicator-pen 44 to the zero, or minimum, position on the chart 45. As signals of greater lengths are produced, such, for example, as along the diagonal line 80, the indicator-pen 44 is moved toward its maximum position. When impulses of maximum length are being transmitted, corresponding with the time of A plus B, nevertheless, there will be a time-space, as indicated at C, between these signals. It is during the time-space C that the contacts 28 and 30 operate. It will also be observed that the signal lengths and time-spaces are complementary, that is, as one increases the other decreases.

More specifically, the graph of Fig. 4 may be considered in terms of the transmitter. Each signal will have a length corresponding with time A plus the time represented by an ordinate extending to the diagonal line 80. The remainder of the time interval will be represented by that portion of the same ordinate which extends from the diagonal line 80 to the end of the time interval C. Since the time spaces between signals are complementary with respect to the lengths of the signals, either the time spaces or the signals may be used to indicate the magnitude of a condition.

It will be remembered that the resistor 38 was described as connected between the contact 35 and the conductor 37. This resistor 36 introduces a non-linear variation in the potential difference between the conductor 37 and the contact 35 during movement of the slidewire from a minimum to a maximum position. When the slidewire 34 is in its minimum position, practically all of the resistance thereof is excluded from the circuit with which the resistor 36 is connected in parallel. When the slidewire 34 is in its maximum position, the resistor 36 is in parallel not only with the resistor 32 but with a substantial part of the resistance of the slidewire 34. By suitably selecting the values of the resistors 26, 32, 33, 34 and 36 a potential difference is produced which varies non-linearly with movement of the slidewire substantially exactly to compensate for the non-linear rise of potential of the capacitor 25. In terms of result, the scale on the recorder chart 45 may be linear. In a typical embodiment of the invention, the capacitor 25 had a capacity of two microfarads. With a resistor 26 of 5 megohms, the shunting resistor 36 of 3400 ohms, a slidewire 34 of 500 ohms, a resistor 33 of 2136 ohms and a resistor 32 of 67.8 ohms, a linear response was obtained within limits of plus or minus one-tenth percent. That is, with time-spaced signals varying from 25 hundredths of a second to 2.5 seconds the maximum error was ±.1%. Graphically, the accuracy is shown by the graph of Fig. 5, where the error in percent of range is shown to be within plus or minus one-tenth percent, for scale readings of from zero to 100% of full scale. This feature of the invention is of advantage and avoids the use of non-linear charts.

While there has been described a preferred embodiment of the invention, it will be understood that further embodiments may be made without departing from the spirit and scope of the invention, as set forth in the appended claims.

What is claimed is:

1. A telemetric measuring system comprising means for producing time-spaced signals with minimum time-spacings therebetween, means for varying the lengths of said time-spaced signals in accordance with existing magnitudes of a condition, a measuring system including a device operable at a normal speed through a cycle for automatically converting the lengths of said signals into indications of the magnitudes of said condition, means operable by said device near the end of each said cycle for slowing down the operation of said device, said device being adapted when operating at said normal speed to complete each said cycle during a time interval not greater than said minimum time-spacing between successive signals, and means responsive to a subsequent one of said signals for initiating operation of said device through another cycle at normal speed thereof.

2. A measuring system comprising means for producing time-spaced signals, means for varying the lengths of said signals in accordance with existing magnitudes of a condition, means operable in a cycle for automatically converting the lengths of said signals into indications of the magnitudes of said condition, phasing means for slowing down the operation of said automatic means near the end of its cycle, and means responsive to a subsequent one of said signals for initiating operation of said automatic means through another cycle.

3. A measuring system comprising means for producing time-spaced signals, means for varying the lengths of said signals in accordance with existing magnitudes of a condition, means operable in a cycle for automatically converting said signals into indications of the magnitudes of said condition, phasing means for slowing down the operation of said automatic means near the end of its cycle, and means operable in the absence of a signal during a predetermined time for initiating operation of said automatic means through another cycle.

4. A measuring system comprising means for producing time-spaced signals, means for varying the lengths of said signals in accordance with existing magnitudes of a condition, means operable in a cycle for automatically converting said signals into indications of the magnitudes of said condition, phasing means for slowing down the operation of said automatic means near the end of its cycle, means operable in the absence of a signal during a predetermined time for initiating operation of said automatic means through another cycle, and means for producing an indication of the absence of a signal within said predetermined time.

5. In a telemetric system having a transmitter for producing a succession of time-spaced signals of a duration, between predetermined limits, corresponding with the magnitude of a condition, the combination with a capacitor of means for changing the charge of said capacitor by amounts determined by the duration of said signals, measuring means including a movable member for periodically measuring the charge of said capacitor and operable in accordance with the magnitude thereof to register between predetermined positions the magnitude of said condition, said measuring means being responsive to charges on said capacitor below and above predetermined amounts for operating said movable member beyond said predetermined positions.

6. Means for measuring magnitudes of a condition comprising a resistor and a capacitor in series therewith, means for changing the charge of said capacitor during successive time intervals whose lengths represent magnitudes of said condition, said capacitor acquiring a voltage which varies non-linearly with respect to time, means for measuring the magnitude of said voltage, said means including a variable resistor for producing a potential difference equal to that of said capacitor, and means including a second resistor in parallel with a part of said variable resistor for producing a non-linear change in said potential difference with change in values of said variable resistor to compensate for the non-linear voltage variation of said capacitor.

7. The combination, with a capacitor, of means including a resistor for charging said capacitor during a succession of time intervals whose lengths represent magnitudes of a condition being measured, said capacitor acquiring a voltage which rises non-linearly with respect to time, a voltage measuring network comprising two variable resistors in series and one fixed resistor connected in multiple with one of said variable resistors, a source of potential connected across said variable resistors, means for adjusting said variable resistors until the voltage across said fixed resistor balances the voltage of said capacitor to produce a non-linear voltage change with change in resistance values of said variable resistors to compensate for the non-linear voltage variation of said capacitor.

8. In a cylically operable signal-measuring and indicating system having a plurality of circuit controllers cyclically operable in predetermined sequence and a measuring network including a slidewire for the measurement of the magnitude of a condition, signal-receiving means, means under the control of said signal-receiving means and including one of said circuit controllers for applying to said network an electrical quantity of magnitude related to the magnitude of the condition, a motor operating a predetermined normal speed for operating said circuit controllers, means including another of said circuit controllers operable at the conclusion of each said measuring cycle for decelerating said motor below said normal speed to delay the start of the subsequent cycle, and means under the control of said signal-receiving means for producing operation of said motor and of said circuit controllers through said subsequent cycle at said normal speed.

9. In a cyclically operable measuring and indicating system having a plurality of circuit-controllers cyclically operable in predetermined sequence, a motor for operating said circuit controllers, means operable at the conclusion of each said cycle for decelerating said motor to delay the start of the subsequent cycle comprising a switch, means under the control of said switch for braking said motor to standstill, a capacitor, means responsive to the charging current of said capacitor for operating said switch to initiate said braking of said motor and automatically operable upon a predetermined decrease in said charging current to remove said braking of said motor, and means operable prior to said predetermined decrease in said charging current for removing said braking action and for initiating a subsequent cycle of operations of said circuit-controllers.

WILLIAM E. PHILLIPS.
FELIX WUNSCH.

REFERENCES CITED

The following references are of record in the file of this patent:

UNITED STATES PATENTS

| Number | Name | Date |
|---|---|---|
| 1,128,126 | Furrer | Feb. 9, 1915 |
| 1,562,273 | Amsler | Nov. 17, 1925 |
| 2,138,668 | Stewart | Nov. 29, 1938 |
| 2,181,803 | Faus | Nov. 28, 1939 |
| 2,336,929 | Doyle | Dec. 14, 1943 |

---

Certificate of Correction

Patent No. 2,441,226.  May 11, 1948.

WILLIAM E. PHILLIPS ET AL.

It is hereby certified that errors appear in the printed specification of the above numbered patent requiring correction as follows: Column 2, line 53, for "Fig. 2," read *Figs. 2 and 6*,; line 54, after "circuit-interrupting" and same line, after "modulating" strike out the commas; column 3, line 8, for "Fig. 2" read *Figs. 2 and 6*; column 4, line 66, strike out the words "must be" and insert instead *is*; column 6, line 35, for "Figs. 1 and 3," read *Figs. 1, 3 and 6*,; line 43, for "Fig. 3" read *Figs. 3 and 6*,; column 11, line 9, claim 8, after "motor operating" insert *at*; and that the said Letters Patent should be read with these corrections therein that the same may conform to the record of the case in the Patent Office.

Signed and sealed this 7th day of September, A. D. 1948.

[SEAL]

THOMAS F. MURPHY,
*Assistant Commissioner of Patents.*